Oct. 18, 1932.  S. COHEN  1,883,579
VARIABLE CONDENSER
Filed Aug. 13, 1931  2 Sheets-Sheet 1
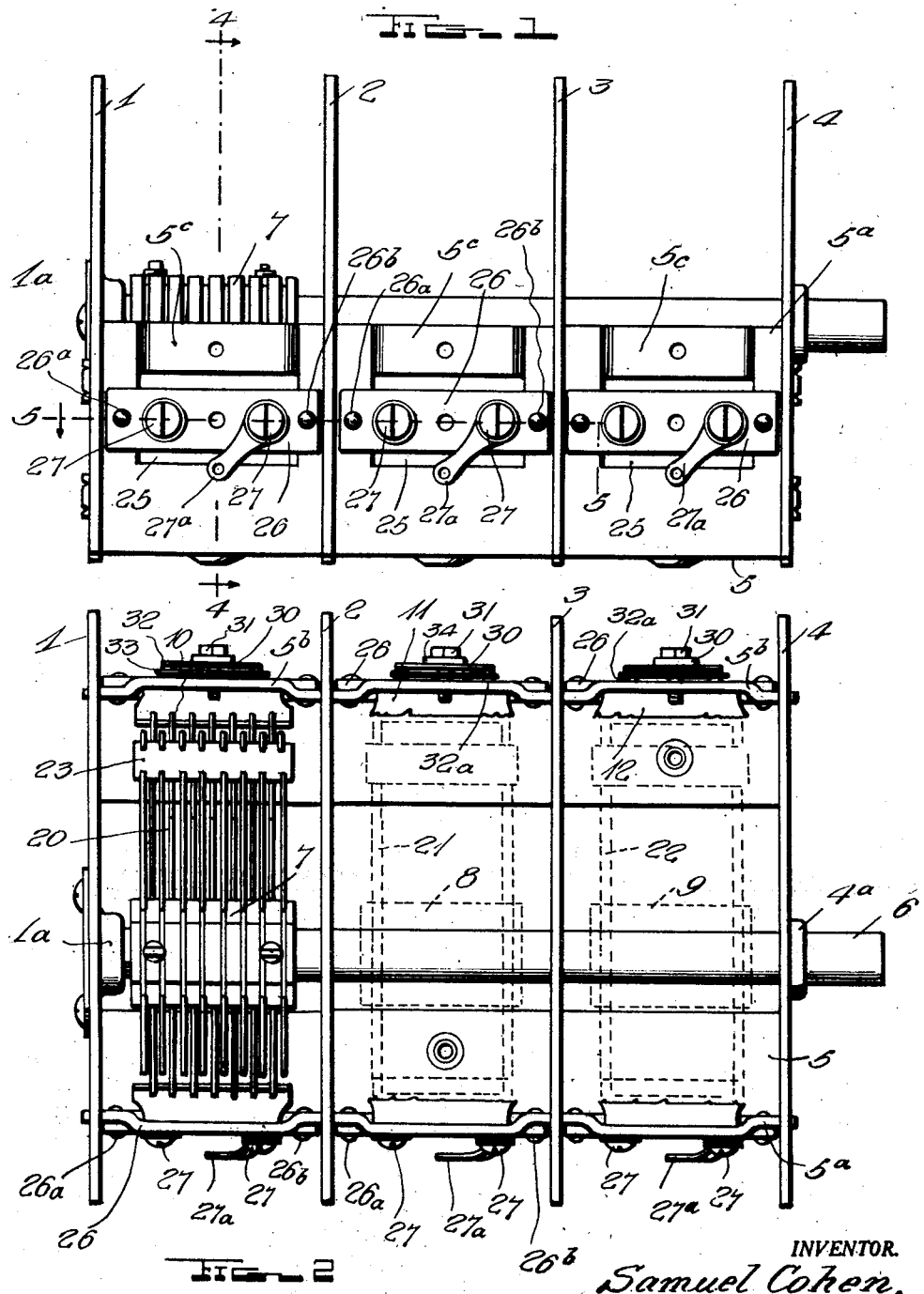
INVENTOR.
Samuel Cohen,
BY
John B. Brady
ATTORNEY Oct. 18, 1932.  S. COHEN  1,883,579
VARIABLE CONDENSER
Filed Aug. 13, 1931  2 Sheets-Sheet 2
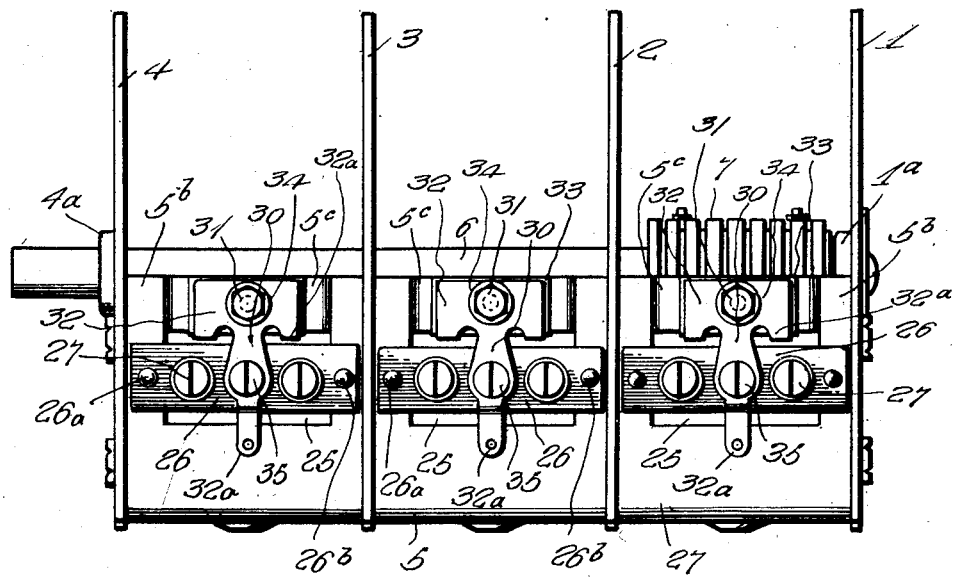
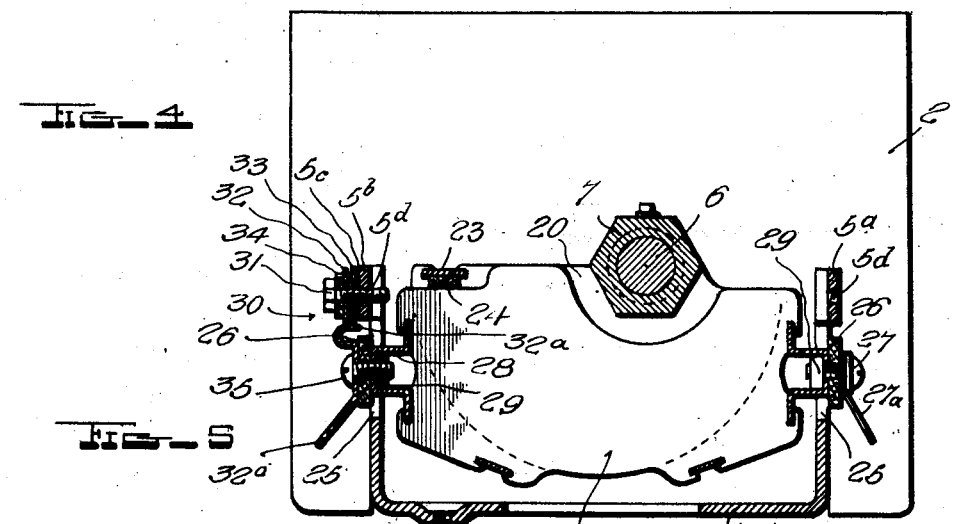
INVENTOR.
Samuel Cohen
BY John B. Brady
ATTORNEY Patented Oct. 18, 1932

1,883,579

UNITED STATES PATENT OFFICE

SAMUEL COHEN, OF BROOKLYN, NEW YORK, ASSIGNOR TO GENERAL INSTRUMENT CORPORATION, OF NEW YORK, N. Y., A CORPORATION OF NEW YORK

VARIABLE CONDENSER

Application filed August 13, 1931. Serial No. 556,887.

My invention relates broadly to electrical condensers and more particularly to a construction of multiple variable condenser having compensating condensers connected with each section thereof.

One of the objects of my invention is to provide means for supporting a plurality of sets of stator plates in a multiple variable condenser in position within a condenser chassis and arranged for cooperation with sets of rotor plates with compensating condensers mounted adjacent one side of each of the sets of stator plates.

Another object of my invention is to provide a construction of multiple variable condenser having a compensating or trimmer condenser individual to each of the sections of the condenser, the compensating condensers being mounted upon individual horizontally extending insulated panel members which also serve to support the sets of stator plates.

Still another object of my invention is to provide a construction of multiple variable condenser including a condenser chassis having a bottom portion and upstanding side portions integral therewith, where the side portions are apertured to permit the support of stator plate sections therethrough by means of individual insulated panel members extending across the apertured side portions of the chassis and providing mounting means for compensating condensers individual to each of the condenser sections.

A further object of my invention is to provide a simplified assembly for mounting the compensating or trimmer condensers of a multiple variable condenser adjacent the stator plate sections of the condenser and in association with the suspension means for the stator plates.

Other and further objects of my invention will be understood from the specification hereinafter following by reference to the accompanying drawings, wherein:

Figure 1 is a side elevation of a multiple variable condenser constructed in accordance with my invention; Fig. 2 is a plan view of the multiple variable condenser illustrated in Fig. 1; Fig. 3 is an opposite side elevation of the multiple variable condenser shown in Fig. 1 and arranged to illustrate the mounting means for the individual compensating condensers used with each of the condenser sections of the multiple variable condenser; Fig. 4 is a lateral cross sectional view taken through the condenser on line 4—4 of Fig. 1; and Fig. 5 is a fragmentary lateral cross-sectional view taken through the individual panel supports for the stator plate sections and compensating condensers on line 5—5 of Fig. 1.

In the quantity production of multiple variable condensers for operating tuning circuits of a radio receiver, I have found that the stator plate sections may be efficiently mounted in the chassis of a multiple variable condenser by suspension between individual horizontally disposed panel members connected with opposite sides of the condenser chassis and serving to support both the stator plate sections of the multiple variable condenser and also the associated trimmer condensers for each of the variable condenser sections. I provide horizontally disposed panel members at each side of the condenser chassis and individual to each of the variable condenser sections. The panel members are mounted upon the side walls of the condenser chassis and extend across apertures provided therein. The stator plate sections extend laterally of the condenser frame and are supported at opposite ends by the individual horizontally disposed insulated panel members. The compensating or trimmer condenser for each section of the multiple variable condenser is mounted upon the individual insulated panels adjacent one end of each of the stator plate sections for fixing the maximum to minimum capacity ratio of each condenser section. Rivet means are provided for securing opposite ends of the individual insulated panels to the side wall of the condenser chassis as will be described in more detail as the specification progresses.

Referring to the drawing in detail, reference characters 1, 2, 3 and 4 represent electrostatic shields or laterally extending plate members connected with the condenser chassis 5 at spaced intervals along the length thereof. The condenser chassis 5 comprises a bottom portion having upstanding side wall portions designated at 5a and 5b. The side wall portions each have aligned apertures 25 disposed therein as shown. A rotatable shaft 6 is journaled within the condenser chassis as shown. The end plate 1 has a journal 1a therein. The end plate 4 carries a journal 4a within which shaft 6 is arranged to revolve. The shaft 6 carries grooved sleeve members 7, 8 and 9 which serve to support the sets of rotor plates represented at 20, 21 and 22, which may be variably interleaved with the sets of stator plates shown at 10, 11 and 12. The stator plates are supported laterally of the condenser chassis and are suspended by screw means passing through the individual insulated panels indicated at 26. The panels 26 are secured at opposite ends by means of rivet members 26a and 26b to the side walls of the chassis on opposite sides of the apertures 25 therein. The individual insulated panels 26 extend between the laterally projecting electrostatic shields or plates 1, 2, 3 and 4, and substantially abut with the faces of the electrostatic shields which extend normal to the individual panels 26. The rivets 26a and 26b pass through the side walls of the condenser chassis on each side of the apertures 25 therein. Screw members 27 extend through the individual panels 26 and through the channel shaped supports 28 which carry opposite ends of the plates constituting the stator section and engage nuts 29 as shown. The stator plate sections are thus rigidly supported laterally of the condenser chassis by suspension from the individual horizontally disposed panel member 26 in a position in which the sets of rotor plates 20, 21 and 22 may be interleaved for varying the capacity of the condenser. Connection is established with the stator plates through lugs 27a secured beneath the head of certain of the securing screws shown at 27.

The trimmer condenser for each of the variable condenser sections has been represented generally at 30. It will be observed that the upper portion of the side wall 5b of the chassis is outstruck as represented at 5c and serves as one capacity area for the compensating condenser. The capacity area 5c has a screw threaded aperture 5d therein which receives the adjusting screw 31 of the trimmer condenser. Adjusting screw 31 passes through the movable plate 32 which is at all times insulated from the fixed capacity area 5c by means of dielectric sheet 33 supported on projections 32a. An insulated washer 34 having a protected bushing thereon is carried by screw 31 and prevents contact between screw 31 and plate 32. Plate 32 is secured by means of screw 35 to the short insulated panel 26. To permit the attachment of the trimmer condenser plate 32 to the short insulated panel 26, a screw threaded aperture 26c is provided in each short channel as shown more clearly in Fig. 5. A depending lug 32a permits electrical connection to be established with the plate 32 and to the stator plates. The compensating condensers are directly shunted across the main condensers and serve to fix the maximum to minimum capacity ratio of the condensers when the supports in which the condensers are used are initially adjusted.

The sets of rotor plates 20, 21 and 22 are each keyed at the edges thereof as represented by the key member 23 adjacent which insulated strip 24 extends for preventing short-circuit between strip 23 and the edges of the stator plates when the rotor plates are moved to maximum capacity position with respect to the stator plates.

I have found the individual insulated panel construction of my invention advantageous in the production and manufacture of variable condensers in quantities. While I have described one of the preferred embodiments of my invention, I desire that it be understood that modifications may be made and that no limitations upon my invention are intended other than are imposed by the scope of the appended claims.

What I claim as new and desire to secure by Letters Patent of the United States is as follows:

1. In a multiple variable condenser, a chassis including a bottom and upstanding side walls having sets of oppositely positioned apertures formed therein, electrostatic shields disposed laterally of said chassis in spaced relation to each other longitudinally thereof and having their end portions projecting outwardly from the side walls of the chassis between the apertures formed therein, a rotatable shaft extending longitudinally of said chassis and passing through said shields, individual insulated panels extending horizontally along said side walls in bridging relation to said apertures with their ends secured against the outer faces of the side walls and between the side edges of the apertures and the extended end portions of said shields, sets of stator plates suspended from said insulated panels between said shields, rotor plates carried by said shaft for variably interleaving with the stator plates, and compensating condensers between the extended end portions of said shields at one side of said chassis disposed above the panels and supported thereby.

2. In a multiple variable condenser, a chassis including a bottom and upstanding side walls having sets of oppositely positioned apertures formed therein, electrostatic shields disposed laterally of said chassis in spaced relation to each other longitudinally thereof and having their end portions projecting outwardly from the side walls of the chassis between the apertures formed therein, a rotatable shaft extending longitudinally of the chassis and passing through said shields, individual insulated panels extending horizontally along said side walls in bridging relation to the apertures formed therein with the ends of said insulated panels abutting against the opposite sides of the electrostatic shields extending between the condenser units in said chassis, sets of stator plates suspended from said insulated panels between said shields, sets of rotor plates carried by said shaft for variably interleaving with said stator plates, and compensating condensers carried by said insulated panels between the extended end portions of said electrostatic shields at one side of said chassis.

In testimony whereof, I affix my signature.

SAMUEL COHEN.